United States Patent Office 3,429,326
Patented Feb. 25, 1969

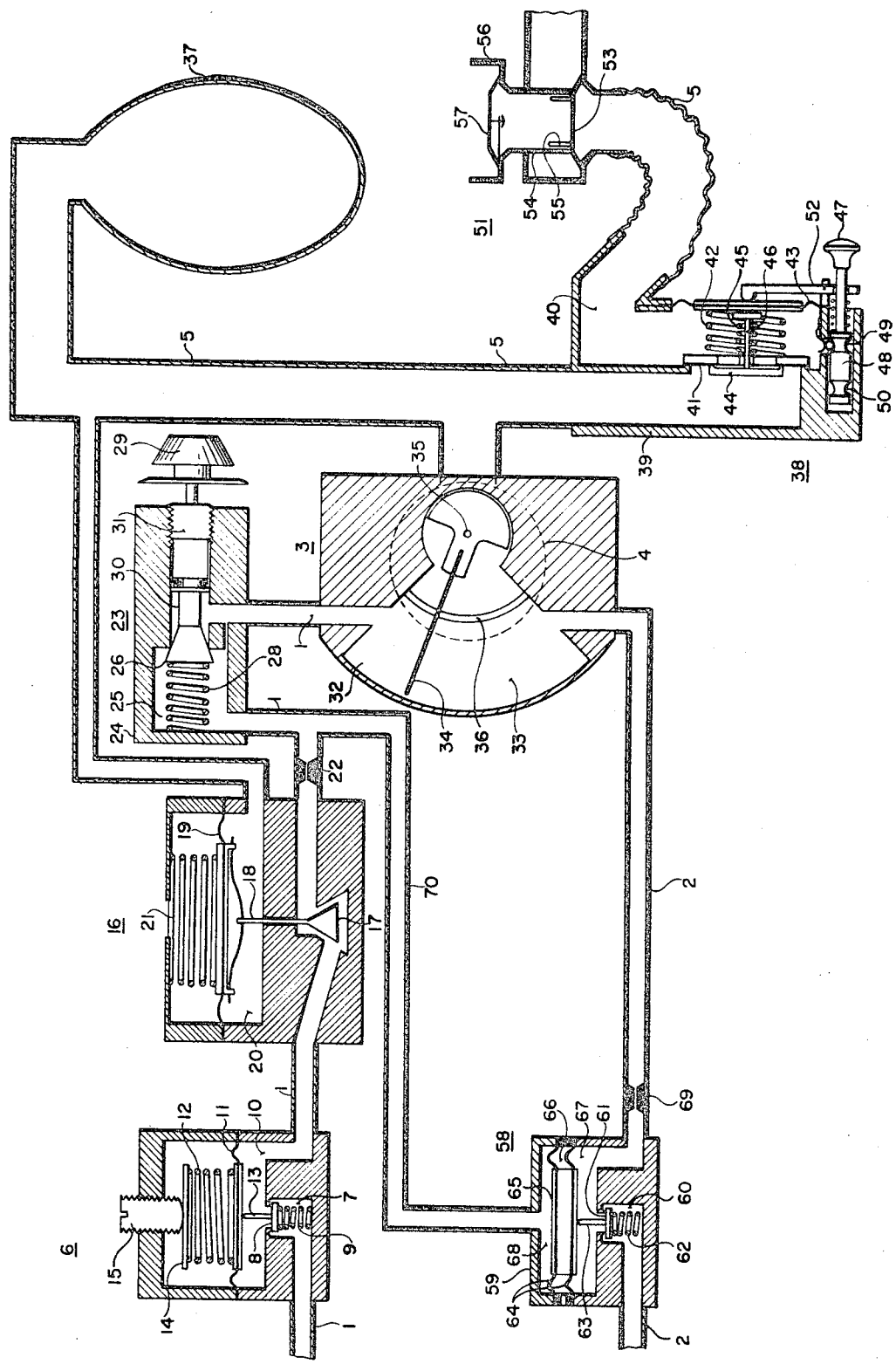

3,429,326
BREATHING APPARATUS FOR SUPPLY-
ING A PAIR OF GASES IN ADJUSTABLE
PROPORTION
Jon Arne Arnell and Dag Olof Alfred Johannisson,
Lidingo, Sweden, assignors to AGA Aktiebolag,
Lidingo, Sweden, a corporation of Sweden
Filed Nov. 18, 1966, Ser. No. 595,507
Claims priority, application Sweden, Jan. 19, 1966,
662/66
U.S. Cl. 137—98                              8 Claims
Int. Cl. G05d 11/03

ABSTRACT OF THE DISCLOSURE

Breathing apparatus supplying two gases in adjustable proportion through a mixing chamber connected to first and second pressure regulators. The second regulator is controlled by pressure from the first regulator. An adjustable throttling device in the conduit of the first regulator controls the change of proportion of the two gases without change in the quantity of gas supplied to the patient.

---

The invention relates to a breathing apparatus for supplying to a patient a pair of gases in adjustable proportion and which comprises a mixing chamber for the gases with which is connected a first conduit with a first pressure regulator provided therein for supplying a first gas, such as oxygen, and having a second conduit connected with the mixing chamber and with a second pressure regulator connected therein for supplying a second gas, such as N₂O, and having a conduit leading from the mixing chamber and for connection to the patient's breathing organs.

In apparatus of this type, it is desirable to have means for controlling the proportion of the gases without substantial change in the total quantity of gas mixture delivered.

It is known to use for this purpose a valve arrangement comprising a pair of valve members mounted on a common stem, each of which controls a valve aperture, so that one aperture is made larger and the other smaller upon movement of the stem in a certain direction. The stem can be moved between two terminal positions, one of which corresponds to complete closure of one aperture and the maximum area of the other aperture, whereby the gas mixture supplied comprises 0% of the one and 100% of the other gas. By adjustment of the stem, each desired proportion from 0 to 100% of one of the gases can be obtained.

In practice it has proved very difficult to make this type of adjusting device operate with the desired degree of precision.

An object of the invention is to provide an adjusting device which is simple and dependable and makes possible accurate adjustment of the proportion between the gases without change in the total quantity of mixture delivered.

An additional object is to avoid the necessity of observing close manufacturing tolerances, which had to be done when the previously known device was used.

According to the invention, this is achieved by an arrangement, in which the membrane of the second pressure regulator obtains control pressure from the downstream side of the first pressure regulator, an adjustable throttling device being connected in the first conduit downstream of the point, from which the control pressure is taken to the second pressure regulator, whereby, upon adjustment of the throttling device, a change in proportion can be obtained without substantial change in the quantity of gas supplied to the patient.

The invention will be described in more detail with reference to an embodiment shown on the drawing.

The embodiment shown has a first feeding conduit 1 for a first gas, which may be oxygen or air, and a second feeding conduit 2 for a second gas, such as N₂O. The conduits lead via a measuring instrument 3 for indicating the proportions of the mixture to a mixing chamber 4, from which issues a conduit 5 adapted to be connected to the patient's breathing organs.

Connected in conduit 1 is a first pressure regulator 6. It comprises a housing having a valve chamber 7 in which a valve disc 8 is urged by a spring 9 towards a valve seat, when it closes the connection between chamber 7 and a membrane chamber 10, from which conduit 1 continues. Provided in membrane chamber 10 is a membrane 11 which is subject to pressure from a spring 12 and exerts pressure on a pin 13 provided on the valve disc and actuates the valve towards the open position when the pressure in chamber 10 drops below a value determined by the strength of the spring 12. This spring is adjustable and abuts a disc 14 which can be adjusted by means of an adjusting screw 15.

Provided in conduit 1 downstream of pressure regulator 6 is a shut-off valve 16 having a valve member 17 connected with a membrane 19 via a valve pin 18. Membrane 19 delimits a membrane chamber 20 and is actuated in the opening direction by a spring 21, whereby the valve is normally open but closes when the pressure in chamber 20 reaches a predetermined value. Since the pressure in chamber 20 depends upon the pressure in the mixing chamber 4 and conduit 5, valve 16 is responsive to the pressure in mixing chamber 4. Preferably, the valve is provided with snap action to make it stand either in the open or in the closed position.

Downstream of valve 16 there is provided in conduit 1 a restriction 22 which is dimensioned so as to make a suitable dosage of gas, such as 40 litres per minute, at normal gas pressure such as 3 atm., flow in the conduit.

Downstream of the restriction 22 there is connected in conduit 1 an adjustable throttling device 23 for measuring the dosage of the first gas. It comprises a housing 24 with a valve chamber 25, to which conduit 1 is connected. In chamber 25 there is provided a valve seat with a valve member 26 which is urged towards the closing position by a spring 28. Adjustment of the valve is by means of a knob 29 mounted on a stem 30 carrying the valve member 26 and having a threaded portion 31 engaging a threaded boring provided in housing 24.

Conduit 1 continues from the dosage throttling device 23 to the gas-proportion measuring instrument 3, more particularly to one portion 32 of a measuirng chamber provided in the instrument and the other portion 33 of which is connected with conduit 2 and separated from portion 32 by a vane 34 which turns on a shaft 35.

From the two portions 32 and 33 of the measuring chamber, the gases flow through a slot 36 down into the mixing chamber 4, which is connected with conduit 5. Since the vane is movable, one and the same pressure will obtain in chambers 32 and 33 and the position of the vane will indicate the proportion of mixture of the gases, this proportion being the same as that of the two portions into which slot 36 is divided by vane 34.

Conduit 5 leads to a rubber bag 37 serving as a reservoir and to an auxiliary valve device 38 and from it on via a breathing valve 51 to the patient.

Valve device 38 comprises a housing 39 having a valve chamber 40 with a valve disc 41 therein, the valve disc being urged towards the closing position by a membrane 43 through a spring 42. A central aperture is provided in valve disc 41 to cooperate with a smaller valve disc 44, which is also urged towards the closing position by a spring 45 connected via a stem 46 with the membrane.

A knob 47 is provided to be adjustable between two positions, the drawing showing the knob in its pushed-down position. Knob 47 is mounted on a shaft 48 having recesses 49 and 50 into which a spring-urged ball can snap so as to determine the two terminal positions to which knob 47 can be adjusted.

In its pushed-down position, knob 47 determines by means of a lever 52 acting on the membrane an outer terminal position for membrane 43, whereas in the outer position of knob 47 membrane 43 is free to move outwardly, whereby the actuation of spring 42 on valve disc 41 is removed.

The valve arrangement 51 is provided with an easily flexible thin valve disc 53, the edge of which seats on a larger valve seat, thereby closing off conduit 5. The central portion of disc 53 seats on a smaller valve seat formed by a tube 54. In the inactive position, disc 53 seats on both of the valve seats referred to; it is retained in position by pins 55 engaging tube 54.

Tube 54 has a wider portion 56, in which there is provided a valve disc 57 serving as a nonreturn valve for the patient's expiration.

Provided in conduit 2 is a second pressure regulator 58 having a housing 59 with a valve chamber 60 therein. A valve member 61 with a spring 62 and a valve stem 63 are provided in the chamber. The details 60, 61, 62 and 63 correspond to details 7, 8, 9 and 13, respectively of pressure regulator 6.

Stem 63 is connected to a double membrane 64, the two parts of which are joined by a membrane body 65 and leave between them an open space 66. This device prevents gas flow upon leakage in the membrane between the two membrane chambers 67 and 68 provided below and above the double membrane 64, respectively.

The lower membrane chamber 67 is connected to conduit 2, a restriction 69 being provided in the conduit between membrane chamber 67 and chamber 33 of the proportion-measuring instrument.

The upper membrane chamber 68 is connected through a conduit 70 with conduit 1 at a point which is downstream of restriction 22 but upstream of throttling device 23.

OPERATION

Pressure regulator 6

This is a conventional pressure reducing device, which will not require detail description. The spring pressure acting from above on membrane 11 is adjustable and opens valve 8, until a corresponding pressure has been reached in chamber 10. The valve then closes and remains closed until the pressure in chamber 10 has gone down below the pressure level determined by spring 12; as soon as the pressure in chamber 10 is below this level, feeding of gas takes place through valve 8.

Shut-off valve 16

The function of this valve consists in either being entirely open when the pressure in chamber 20 is below a predetermined threshold value or to be entirely closed when the pressure is above the threshold value. This value is determined by the force exerted from above on membrane 19.

Pressure regulator 58

The function is fundamentally the same as that of regulator 6, but instead of a spring action there is the pressure in conduit 70, which determines the force acting on the upside of membrane 64. In consequence of this, the reduced pressure in chamber 67 varies with the pressure in conduit 1 upstream of restriction 23.

An important feature of the arrangement shown is that the second gas, which is fed through conduit 2, cannot get through unless gas is supplied through conduit 1, since valve 61 can open only when a pressure is present in conduit 1 and acts on membrane 64 via conduit 70.

Throttling device 23

Adjustment of this device determines how large a quantity per unit time of the first gas is supplied to proportion-measuring instrument 3. If knob 29 is turned to reduce the quantity of the first gas, which causes a higher amount of throttling to be provided in device 23 owing to the valve member 26 being moved closer to the closing position, a pressure increase is generated in conduit 1 upstream of device 23 and this increase is translated through conduit 70 to chamber 68. This causes pressure regulator 58 to adjust itself to a higher pressure and a larger quantity of gas per unit time flows through conduit 2. By suitable dimensioning, it is possible to realize a type of operation in which a decrease of the gas quantity flowing through conduit 1 owing to an increased throttling in device 23 corresponds to a substantially equal increase of gas flow through conduit 2, whereby the total quantity of gas leaving mixing chamber 4 is substantially constant.

Valve arrangement 38

The essential function of this arrangement is in connection with giving the patient artificial respiration by means of a pressure on the rubber bag. By observing the rubber bag, it is possible to see if the patient's spontaneous breathing ceases, for the bag normally moves in the rhythm of the patient's breathing. If it is desired to give artificial respiration, the bag 37 is compressed. Air is then forced out through valve arrangement 38, the valve disc 41 of which is unseated by the pressure in conduit 5. The gas mixture flows through chamber 40 and under the edge of valve disc 53 to the patient The pressure in conduit 5 then presses valve disc 53 against tube 54. When the inspiration is completed, this pressure must be removed to make possible for the patient to breathe out through tube 54 and valve 57, since this expiration has to take place by means of the expiratory pressure acting on the peripheral part of valve disc 53 so as to unseat it from the tube 54.

If this operation is to be possible, the pressure on the underside of valve disc 53, as was mentioned above, must be removed. To this end valve disc 44 can move away from disc 41 and makes it possible for the gas to flow from conduit 5 back to rubber bag 37.

When knob 47 is in the drawn-out position, membrane 43 is free to move and continuous flow of the gas mixture can take place.

We claim:

1. Breathing apparatus for supplying to a patient a pair of gases in adjustable proportion comprising:
    a mixing chamber for gases,
    a first conduit connected to the mixing chamber and having a first pressure regulator for supplying a first gas,
    a second conduit connected to a mixing chamber and having a second pressure regulator for supplying a second gas, and
    a conduit issuing from the mixing chamber for connection to the patient's breathing organs,
    characterized in,
    that the membrane of the second pressure regulator obtains control pressure from the downstream side of the first pressure regulator,
    an adjustable throttling device being connected in the first conduit downstream of the point from which the control pressure is taken to the second pressure regulator,
    whereby upon adjustment of the throttling device a change in proportion can be obtained without substantial change in the gas quantity supplied to the patient.

2. Breathing apparatus according to claim 1, characterized by a measuring instrument connected upstream of the mixing chamber for indicating the proportion.

3. Breathing apparatus according to claim 1, characterized by a restriction in the first conduit downstream of the pressure regulator and upstream of the point from which the control pressure is taken.

4. Breathing apparatus according to claim 1, characterized by a restriction in the second conduit downstream of the pressure regulator.

5. Breathing apparatus according to claim 1, characterized by a reservoir for the gas mixture connected to the mixing chamber.

6. Breathing apparatus according to claim 5, characterized in that the reservoir is a rubber bag.

8. Breathing apparatus according to claim 7, characterized by a shut-off valve provided in the first conduit and responsive to pressure in the mixing chamber for shutting-off the first conduit when the said pressure exceeds a predetermined value.

8. Breathing apparatus according to claim 7, characterized in that the shut-off valve is adapted to close when the pressure bag has become full.

References Cited

UNITED STATES PATENTS

| | | | |
|---|---|---|---|
| 2,948,292 | 8/1960 | Fitt | 137—63 |
| 3,202,163 | 8/1965 | Howland | 137—98 |

NATHAN L. MINTZ, *Primary Examiner.*